US005468971A

United States Patent [19]

Ebstein et al.

[11] Patent Number: 5,468,971

[45] Date of Patent: * Nov. 21, 1995

[54] VERIFICATION DEVICE FOR CURRENCY CONTAINING AN EMBEDDED SECURITY THREAD

[76] Inventors: Steven Ebstein, 67 Pelham St., Newton, Mass. 02159; Robert A. Gonsalves, 16 Lexington St., Woburn, Mass. 01801; Richard A. Menelly, 87 Beldew Rd., Burlington, Conn. 06013

[ * ] Notice: The portion of the term of this patent subsequent to Mar. 21, 2012, has been disclaimed.

[21] Appl. No.: 212,217

[22] Filed: Mar. 14, 1994

[51] Int. Cl.$^6$ .......... G06K 5/00

[52] U.S. Cl. .......... 250/556; 382/135

[58] Field of Search .......... 250/556; 356/71; 382/7–9; 283/85, 91; 209/534

[56] References Cited

U.S. PATENT DOCUMENTS

| | | | |
|---|---|---|---|
| 4,309,602 | 1/1982 | Gonsalves et al. | 250/201.9 |
| 4,435,834 | 3/1984 | Pauli et al. | 250/556 |
| 4,524,276 | 6/1985 | Ohtombe | 250/338 |
| 4,652,015 | 3/1987 | Crane | 283/91 |
| 4,761,205 | 8/1988 | Crane | 162/103 |
| 4,837,840 | 6/1989 | Goldman | 356/71 |
| 4,980,569 | 12/1990 | Crane et al. | 250/556 |
| 5,151,607 | 9/1992 | Crane et al. | 250/556 |
| 5,210,398 | 5/1993 | Metlitsky | 235/462 |
| 5,260,582 | 11/1993 | Danek et al. | 250/556 |
| 5,308,992 | 5/1994 | Crane et al. | 250/556 |
| 5,399,874 | 3/1995 | Gonsalves et al. | 250/556 |
| 5,416,307 | 5/1995 | Danek et al. | 235/449 |

OTHER PUBLICATIONS

"Phase Retrieval and Diversity in Adaptive Optics" Robt. Gonsalves Phd *Optical Engineering,* Sep.–Oct. 1982 vol. 21.

*Primary Examiner*—Stephone B. Allen

[57] ABSTRACT

A linear array of photoemitters and photodiodes are positioned on opposite sides of currency paper for denomination and verification determination under transmitted light. The photoemitters are arranged for projecting an image of the indicia printed on the security thread embedded within the currency paper. The photodiodes receive the image and connect with a processor circuit which determines the presence or absence of the security feature, reads the denomination indicia and correspondingly provides indication thereof. The processor contains stored information identifying currency denomination and a comparison is made at the time of verification to also determine the denomination of the proffered currency.

20 Claims, 3 Drawing Sheets

VERIFICATION DEVICE FOR CURRENCY CONTAINING AN EMBEDDED SECURITY THREAD

BACKGROUND OF THE INVENTION

The use of a metallized plastic strip embedded within currency paper as a security thread for counterfeit deterrence is described within U.S. Pat. No. 4,652,015 and 4,761,205. The security thread is virtually undetected under reflected light and legible under transmitted light to verify its presence. In commercial situations where verification of currency bills is required, the receiver of the currency bill must subject the currency to a relatively intense light source to read the security thread under transmitted light. With large queues of customers at a bank or supermarket, as well as in places of low level illumination such as bars and restaurants it is difficult to visually inspect the corresponding large number of currency bills. It would be advantageous therefore to have some means of automatically determining the presence of the requisite security thread and confirming authenticity to the teller or cashier to determine whether or not a security thread is embedded in the paper-like material and also to determine what the detected security material is made of.

Countries outside of the United States that employ plastic or metal security threads embedded in their paper currency, require that the presence of such security threads be ascertained under transmitted light such as described in the aforementioned U.S. Pat. No. 4,524,276. In accordance with the United States requirement that the currency security thread be-detected under transmitted light and not seen under reflected light, both reflective and transmissive determinations are made for complete verification of the currency.

U.S. Pat. No. 4,980,569 describes a security paper verification device wherein optical means are arranged on opposing surfaces of the currency to determine the absence of any device on the surface of the currency paper while detecting the presence of the device within the currency. This is to prevent attaching counterfeit security threads to the outside surface of the currency paper to replicate genuine currency.

U.S. Pat. No. 5 151 607 entitled "Currency Verification Device" describes the combination of optical means with inductive or capacitive sensors for verifying the presence of the security thread in currency paper.

U.S. Pat. No. 5,308,992 entitled "Security Paper Verification Device" describes optical, magnetic and capacitive sensors used in combination to determine currency authenticity. The dark inks and dyes used in printing U.S. federal reserve notes could provide difficult indication of a metallized security thread when such optical sensors are used, per se.

U.S. Pat. No. 5,260,582 entitled "Currency Verification Device for Detecting the Presence or Absence of Security Threads" describes an optical array arranged on one or both sides of a currency-receiving slot to determine whether the requisite security thread is present within the paper or on either surface. The device includes a microprocessor for calibration of the optical arrays.

U.S. Pat. No. 5,416,307 entitled "Security Paper Verification Device" describes an optical array directed on one side of proffered currency paper to determine whether the requisite security thread is present within the paper or on the outer surface. The array is of the type employing multi-focus optical scanners.

U.S. Pat. No. 5,399,874 entitled "Currency Verification Device" describes an optical array employing phase diversity algorithms to ascertain the presence of a security thread as well as currency denomination.

It would be economically advantageous to directly read the information from the security thread embedded within the currency without having to rely on both reflective and transmissive optics to ascertain that the currency is genuine..

One purpose of the invention is to describe an optical system that simultaneously determines the presence of a security thread within U.S. currency while directly reading the currency denomination printed thereon.

SUMMARY OF THE INVENTION

Currency verification and denomination is made by means of an optical array consisting of photoemitters and photodiodes arranged on opposite sides of currency paper to determine the presence of the embedded security thread and to directly read the currency denomination. The photoemitters are arranged to transmit an image of the currency indicia on the embedded security thread to the corresponding photodiodes. A logic circuit connected with the photodiodes contains stored values of the various currency denominations and the real time images are compared to the stored values to determine the presence of a security thread as well as to read the currency denomination.

DESCRIPTION OF THE PREFERRED EMBODIMENT

Figure 1:
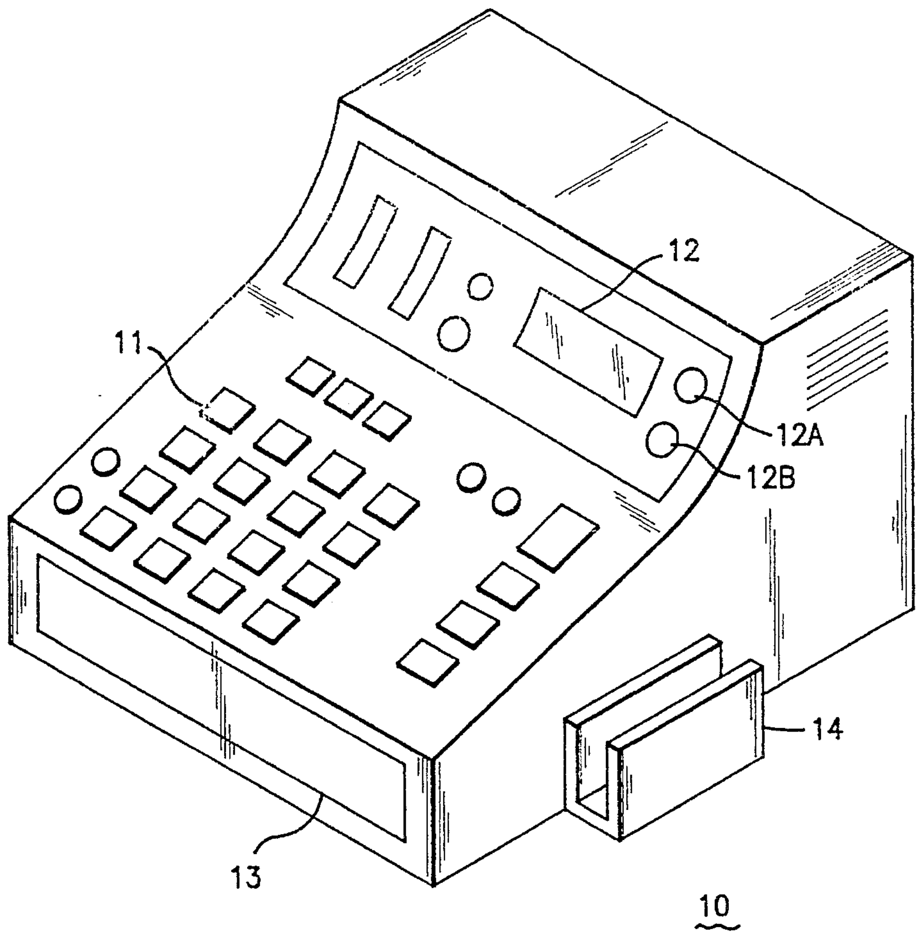
FIG. 1 is a top perspective view of a currency receiver employing the verification device according to the invention.

The verification device 14 according to the invention can be used with a cash receiver such as the cash register 10 shown in FIG. 1 with the verification device attached to the cash register next to the cash drawer 13.The device could be in the form of a currency receiver as described in aforementioned U.S. Pat. No. 4,980,569 or in the form of the optical scanners described within aforementioned U.S. patent application. If desired, the verification device could provide electromagnetic as well as electromechanical interlock with the cash register so that the cash receiver drawer would not open in the event that counterfeit currency is detected within the verification device. The cash register is of the type using a keypad 11 and a display 12 to depict the price of goods being purchased as well as the denomination of the cash proffered by the customer. The same display could automatically register the denomination of the genuine currency within the verification device or, a green light-emitting diode 12A could provide visual indication of genuine currency whereas a red light-emitting diode 12B could indicate the presence of counterfeit currency. The outputs of the verification device could be connected in feedback relation with the cash register control circuit to count the change from the cash drawer to speed up the transaction, if so desired.

Figure 2:
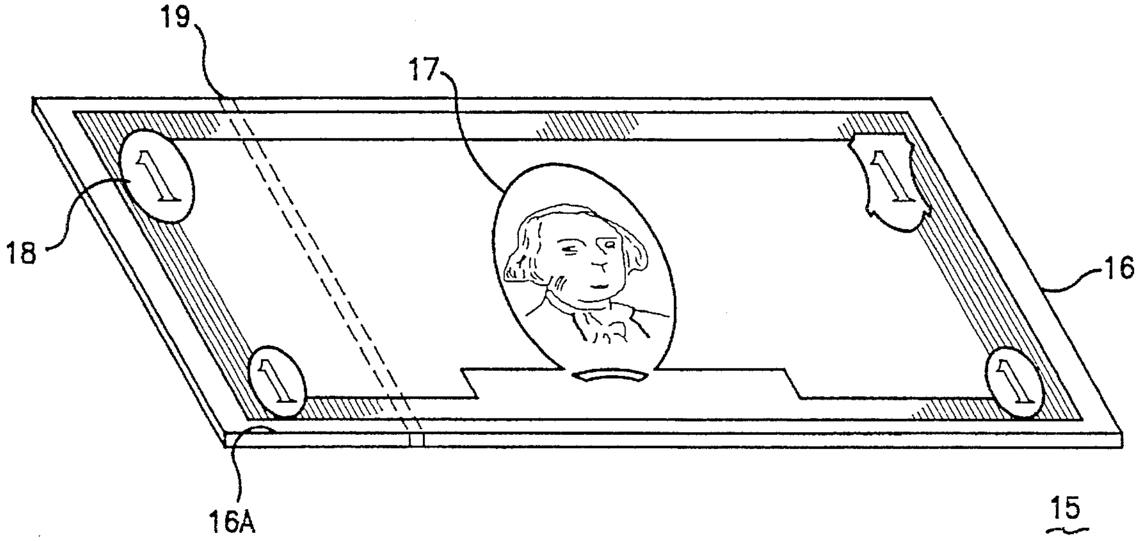
FIG. 2 is a top perspective view of a U.S. currency bill employing a selectively metallized security thread.

FIG. 2 depicts one type of United States currency 15 consisting of a paper bill 16 having the portrait 17 of a United States president or the like and including a security thread 19 embedded therein. The bill is selectively color-printed to enhance the various features printed on both sides of the bill except for a border 16A and currency denomination indicia 18 which retain the basically "white" color of the currency paper prior to printing. It is noted that the security thread extends transversely across the linear extent of the bill from the top to the bottom thereof. The security thread is introduced within the paper in the manner described within the aforementioned U.S. Pat. Nos. 4,652,015 and 4,761,205. The security thread is of the type consisting of a selectively metallized plastic film that is virtually invisible in reflected light and readily apparent under transmitted light. In order to verify the authenticity of such currency, a two-fold test must be performed, whereby the security thread must not be detected upon reflected light and, on the other hand, must be detected under transmitted light. The security strip includes the letters "USA" followed by the currency denomination in numerical characters and is alternately inverted to facilitate visual access from either side of the paper.

Figure 3:
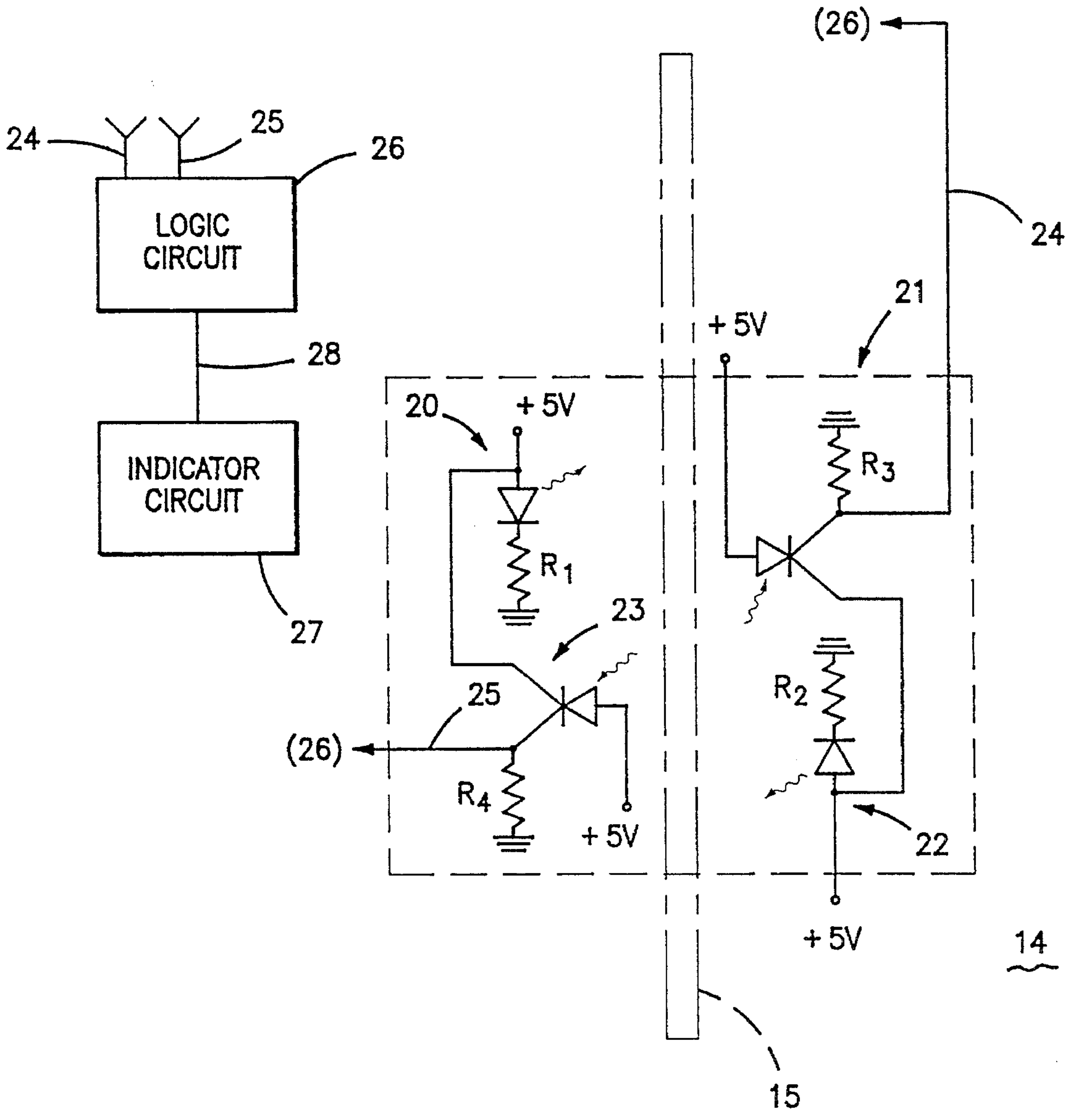
FIG. 3 is a diagrammatic representation of the arrangement of the currency within the logic circuit used with the device of FIG. 1

As best shown in FIG. 3, the verification device 14 includes a first and second linear array of photoemitters 20, 22, arranged on opposite sides of the currency 15. The photoemitters can comprise photodiodes, lasers or a high intensity incandescent light source that is optically-coupled through a fiber optic array. Although a single array on one side of the currency paper is sufficient for reading the numerical characters, redundant data is obtained for more efficient character recognition and the data obtained within the corresponding opposing photodiode arrays 21,23 is compared for greater accuracy. In the manner described within aforementioned U.S. Pat. No. 5,151,607, the photoemitters are coupled to ground through current limiting resistors R1, R2 and are positioned opposite corresponding first and second linear arrays of photodiodes 21, 23 that are biased by means of the resistors R3,R4. One such arrangement of a modular array of photodiodes is a type D Series CCD photodiode array supplied by EG&G RETICON, Sunnyvale, Calif. One such photodiode array including 256 photodiodes is capable of reading the characters on the security threads used with all denominations of U.S. currency. The transmitted light incident on the photodiodes generates a photocurrent which is integrated and stored as a charge on the capacitance of each of the photodiodes. The photodiodes are adapted for image character recognition and look-up tables are prepared for each currency denomination in accordance with the security thread characters. A file corresponding to the characters is stored in look-up table format within the associated circuitry. A second algorithm is used to read the test file generated by the test image and to correlate the test image array with the reference array and identify which of the reference arrays matches the test array for denomination indication. A compensation algorithm provides filtering to discount data bits which may not correspond exactly to the stored data to compensate for fading effects as well as slight printing offsets. As described within the aforementioned U.S. patent application (VER6), phase retrieval optics can be used to produce a resultant clear image and to compensate for distortion caused by the relative motion between the currency and the photodiodes in accordance with the teachings of U.S. Pat. No. 4,309,602 entitled "Wavefront Sensing by Phase Retrieval". The intentional "blurring" described therein can be achieved by intentionally de-focussing selected photoemitters within the photo-emitter array. The application of phase retrieval adaptive optics to produce a clear image is further described in an article entitled "Phase Retrieval and Diversity in Adaptive Optics", published in the Optical Engineering Journal, September/Octobers 1982.

Figure 4:
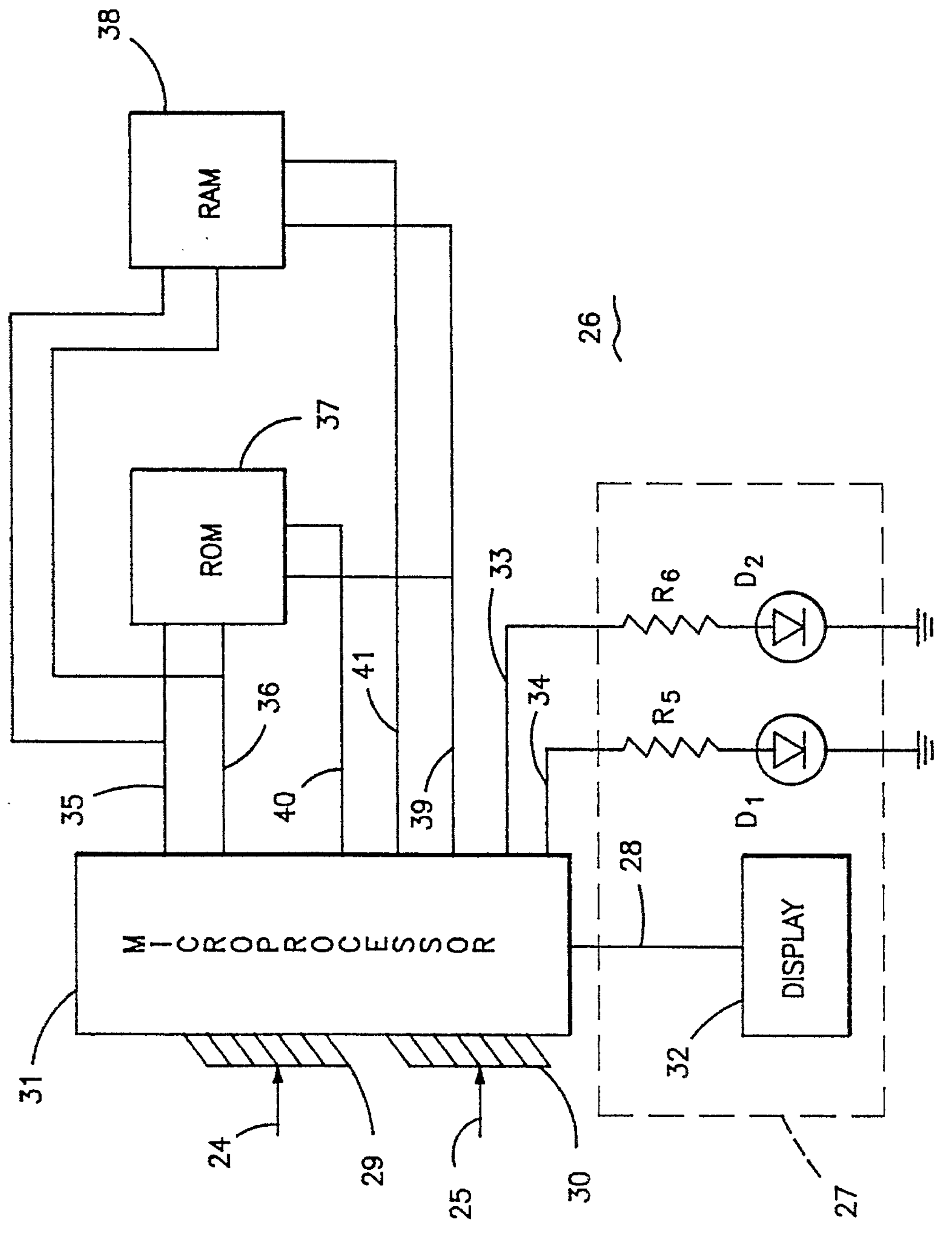
FIG. 4 is a schematic representation of the components within the logic circuit of FIG. 3.

Referring now to the verification device 14 of FIG. 3 and to the logic circuit 26 in FIG. 4, the outputs from the photodiode arrays 21, 23 are transmitted to I/O ports 29,30 of the microprocessor 31 within the logic circuit 26 over the associated data buses 24, 25 respectively. The currency denomination as well as pass-fail indication is made by means of the display 32 within the indicator circuit 27 which connects with the microprocessor by means of conductor 28.

The microprocessor 31 operates in the manner described in the aforementioned U.S. patent application Ser. No. 115,775 entitled "Security Paper Verification Device." The input data to the I/O ports is read in the manner to be described below in some detail. After every reading, the microprocessor is cleared and "pass" or "fail" information is outputted to the red and green light emitting diodes D1,D2 through conductors 33,34 and current limiting resistors R5,R6 while alphanumeric indication of currency denomination is provided by the display 32. The real time data from the microprocessor is entered into the RAM 38 for comparison with the stored data contained within ROM 37 over the data bus 35. The address bus 36 addresses the ROM and RAM to make the comparisons with the stored denomination and verification data. The select conductor 39 interconnects the microprocessor with the ROM and the RAM and the enable conductors for the ROM and RAM are designated as 40,41.

As described within both of the referenced U.S. patent applications, U.S. currency "signatures" are obtained for genuine currency by obtaining optical data from the genuine currency and storing the optical data within the ROM in look-up table format and comparing the test data by means of a test algorithm stored in the ROM. The test algorithm is used to read the test file generated by the test image and to correlate the test image array with the reference array and identify which of the reference arrays matches the test array for denomination indication. The ROM contains the auto correlation and compensation algorithms, also described earlier, to provide filtering to discount data bits which may not correspond exactly to the stored data to compensate for fading effects, printing offsets and the unintentional blurring caused by the motion of the photodiodes or the currency.

The diode arrays 20,21 can be arranged within a multi-focus scanner such as described within U.S. Pat. No. 5,210, 398. To achieve the phase diversity effect described within the aforementioned U.S. patent application (VER6) a single scanner can provide both the clear and blurred images simultaneously. A first pattern is developed corresponding to the focused images on the security thread for each currency denomination and a second pattern is developed for the blurred images corresponding to the denominations. The information is correlated to provide a single sharply-focused image which is stored for later comparison with the test data as described within the aforementioned Application.

The photoemitters and photodiodes on the same side of the paper can be arranged similar to that described within the aforementioned U.S. Pat. No. 4,890,569 which were arranged therein for determining whether the security thread was present on the surface. In the arrangement depicted herein, the photoemitters are arranged for reflection off the surface of the security thread onto the photodiodes to read the indicia on the security thread. The wavelength of the photoemitters is determined for optimum reflection off the aluminum material that comprises the alphanumeric currency indicia and the foci of the photoemitters are directed onto the surface of the security thread for optimum reflection.

A simplified arrangement has herein been described for optical verification of security papers of the type containing security threads which are not readily visible on the outer surface of the paper. Genuine currency is scanned to produce a signature corresponding to the alphanumeric indicia printed on the security thread which is stored in memory. Subsequent scans are compared to the stored signature to determine both denomination as well as verification.

We claim:

1. Apparatus for authenticating and denominating currency paper comprising;

a first light emitter arranged along one side of a paper containing an embedded security thread providing an optical pattern corresponding to indicia contained on said security thread;

a first light detector arranged along an opposite side of said paper receiving said optical pattern; and logic circuit means connecting with said first light detector comparing said optical pattern to stored values contained therein.

2. The apparatus of claim 1 including means providing indication as to whether or not said optical pattern compares with said stored values.

3. The apparatus of claim 1 wherein said first light emitter comprises light emitting diodes, lasers or incandescent light.

4. The apparatus of claim 1 wherein said first optical detector comprises an optical diode.

5. The apparatus of claim 1 wherein said first light emitter comprises an optical emitter array.

6. The apparatus of claim 1 wherein said first light detector comprises an optical detector array.

7. The apparatus of claim 1 including a second light emitter arranged along said one side of said proffered paper providing a second optical pattern corresponding to a security device embedded within said proffered paper.

8. The apparatus of claim 7 including a second light detector arranged along said opposite side of said paper receiving said second optical pattern, said second being connected with said logic circuit for comparing said optical pattern to second stored values contained therein.

9. The apparatus of claim 7 wherein said second light emitter comprises light emitting diodes, lasers or incandescent light.

10. The apparatus of claim 8 wherein said second optical detector comprises optical diodes.

11. The apparatus of claim 7 wherein said second light emitter comprises an optical emitter array.

12. The apparatus of claim 8 wherein said second light detector comprises an optical diode array.

13. Apparatus for authenticating and denominating currency paper comprising:

a pair of first light emitters arranged along one side of a paper containing an embedded security thread providing an optical pattern corresponding to indicia contained on said security threads one of said first light emitters being focussed on said security thread to provide a clear image of said indicia and the other of said first light emitters being unfocussed on said security thread to provide a blurred image of said indicia;

a light detector arranged along an opposite side of said paper receiving said clear and blurred images; and logic circuit means connecting with said first light detector combining said clear and blurred images to produce a resultant image of said indicia.

14. The apparatus of claim 13 wherein said light emitters comprise light emitting diodes, lasers or incandescent light.

15. The apparatus of claim 13 wherein said light detector comprises an optical diode.

16. A method of denominating commercial paper and currency comprising the steps of:

providing a paper containing an embedded security thread having indicia of commercial value;

arranging a light emitter on one side of said paper providing an optical pattern corresponding to said indicia arranging a light detector along an opposite side of said paper receiving said optical pattern; and connecting logic means with said first light detector for comparing said optical pattern to stored values contained therein to thereby determine said commercial value.

17. A method of denominating commercial paper and currency comprising the steps of:

providing a paper containing an embedded security thread having indicia of commercial value;

arranging a pair of light emitters on one side of said paper, one of said light emitters providing a first clear image of said security thread and the other of said light emitters providing a blurred image thereof;

arranging a pair of light detectors on an opposite side of said paper in optical communication with said light emitters;

connecting said light detectors with a logic circuit containing stored data indicative of said security thread;

combining said clear and blurred images to form a resultant image; and comparing said resultant image with said stored data for determining said commercial value.

18. Apparatus for authenticating and denominating currency paper comprising;

a first light emitter arranged along one side of a paper containing an embedded security thread providing an optical pattern corresponding to indicia contained on said security thread;

a first light detector arranged along said one side of said paper receiving said optical pattern; and logic circuit means connecting with said first light detector comparing said optical pattern to stored values contained therein.

19. The apparatus of claim 18 wherein said first light emitter comprises light emitting diodes, lasers or incandescent light.

20. A method of denominating commercial paper and currency comprising the steps of:

providing a paper containing an embedded security thread having indicia of commercial value;

arranging a light emitter on one side of said paper providing an optical pattern corresponding to said indicia arranging a light detector along said one side of said paper receiving said optical pattern; and connecting logic means with said first light detector for comparing said optical pattern to stored values contained therein to thereby determine said commercial value.

* * * * *